(12) United States Patent
Ronström et al.

(10) Patent No.: US 6,263,338 B1
(45) Date of Patent: Jul. 17, 2001

(54) METHOD RELATING TO DATABASES

(75) Inventors: Ulf Mikael Ronström, Hägersten; Lars Joakim Larsson, Åkersberga; David Jacobsson, Danderyd, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/115,674

(22) Filed: Jul. 15, 1998

(30) Foreign Application Priority Data

Jul. 21, 1997 (SE) .................................................. 9702759

(51) Int. Cl.⁷ ...................................................... G06F 11/00
(52) U.S. Cl. ............................. 707/8; 707/101; 707/102; 707/104; 707/205
(58) Field of Search ........................... 707/1, 8, 7, 201, 707/202; 395/439, 618

(56) References Cited

U.S. PATENT DOCUMENTS

| | | | |
|---|---|---|---|
| 5,481,694 | * | 1/1996 | Chao et al. ........................... 395/439 |
| 5,638,508 | * | 6/1997 | Kanai et al. ......................... 395/182 |
| 5,721,918 | * | 2/1998 | Nilsson et al. ........................ 395/618 |
| 5,864,849 | * | 1/1999 | Bohannon et al. ....................... 707/8 |
| 5,907,673 | * | 5/1999 | Hirayama et al. .................... 395/182 |
| 5,933,593 | * | 8/1999 | Arun et al. ............................ 395/182 |

\* cited by examiner

*Primary Examiner*—Thomas Black
*Assistant Examiner*—Thuy Do
(74) *Attorney, Agent, or Firm*—Burns, Doane, Swecker & Mathis, L.L.P.

(57) ABSTRACT

The present invention relates to a method pertaining to databases and intended to provide reliable collection of log-information in connection with changes in the database. So-called fuzzy check-points are used in combination with a physiological log with the intention of enabling log-information to be collected in real time. The data-information belonging to the database is divided into smaller parts in accordance with a predetermined data-structure, where respective parts are distributed on mutually the same pages or on separate pages belonging to the database. The logical UNDO-information required for the fuzzy check-point is implemented through the creation of a further part (1') on one of the pages, in the event of a change of one of the parts (1) where old data-information shall be replaced with new data-information. This further part (1') is structurally a replica of the changed part (1). The changed part (1) includes the new data-information (A') and the further part (1') includes the old data-information (A).

10 Claims, 2 Drawing Sheets

METHOD RELATING TO DATABASES

FIELD OF INVENTION

The present invention relates to a method that pertain to a database and that is intended to provide reliable collection of log-information in connection with database changes.

The method utilises fuzzy check-points with the object of enabling the waiting times that normally occur at consistent check-points to be reduced, wherein these fuzzy check-points are combined with a physiological log with the intention of enabling log-information to be collected in real time.

Data information belonging to the database is divided into smaller parts in accordance with a predetermined data-structure, wherein respective parts are distributed on a common page or on separate pages belonging to the database.

The inventive method can be applied in particular with applications that concern distributed databases where there is a need for a location and replica independent log.

BACKGROUND OF THE INVENTION

Two basic database structures will be described by way of introduction, together with a few associated properties, namely a disk memory database and a primary memory database.

In a disk memory database, part of the information, the information latest used, lies in a primary memory while the remainder lies in a disk memory. In this case, if the desired information does not happen to be already stored in the primary memory it must be taken from the disk memory and entered in the primary memory. The new information taken from the disk memory is written over the information that is present in the primary memory, and if this written-over information shall be used at a later stage, it is necessary to recollect said information from the disk memory. The memory content is divided into pages and the pages are handled independently of one another. For instance, new information can be taken into one page, while another page remains unaffected.

In the case of a disk memory database, the data-structure in the primary memory is normally a 1:1 mapping of the structure in the disk memory.

Since the memory content of the primary memory of a disk memory database is updated to the disk memory one page at a time, the links between different pages are inconsistent upon the restart of a system subsequent to a crash. Consistent check-points are thus often difficult to implement in conjunction with disk memory databases.

Consistent check-points are easier to achieve in a primary memory database. For instance, this consistency can be readily achieved by having two replicas of the database in disk memory. That is, a replica of the latest or current version of the database and a replica of the older version. This is possible because the whole of the database is found in the primary memory at once and different versions of the database where it is known that consistency prevails between all pages according to a given check-point can then be readily stored in the disk memory.

It may be that certain attributes belonging to an object in a database are primary-memory based, while other attributes within the same object are disk-memory based. Tables that constitute a mixture between a disk-memory database and a primary memory database may also be found.

A database includes data tables that are formatted in different ways. A table is comprised of a number of columns, where each column contains a certain kind of information. Each column is allocated a specific attribute and the information in said column is formatted in accordance with this attribute.

Examples of attributes are that the information stored is formatted as an integer, with or without signs, a floating number, a decimal number, a date, text, and so on.

Other factors determined by the attribute include:

when the attribute is a fixed attribute, i.e. when the content takes-up a fixed memory size;

when the attribute is a variable attribute, i.e. the attribute can vary in size; or when the attribute is a dynamic attribute, i.e. when the attribute is present or absent, such as a selectable or optional attribute.

A dynamic attribute may either be variable or fixed.

An object in a table corresponds to a row or line in the table and includes the attributes (columns) present in the table. An object can thus include a mixture of the aforesaid different attributes.

A table listing personal information concerning a group of persons is one example in this regard. Different attributes may include Christian name(s), surname, street address, postal address, telephone number, date of birth and other optional comments.

Date of birth is a fixed attribute (if it is entered on a predetermined format), while name, address and telephone number are variable attributes and comments is a dynamic variable attribute.

An object is then a person and information relating to that person.

There are many ways in which a table according to this example can be stored. The table can be stored in the fixed memory spaces in a consecutive sequence in a memory. This requires a large amount of memory space, the greater part of which will be empty in order to be able to prepare space for variable and dynamic attributes. The variable attributes will then only be variable in a limited way according to the size of the allocated memory space.

Alternatively, each object can be given a header that discloses the size of the variable attributes and also whether a dynamic attribute is present or not, and also the size of such attributes if present. Thus, when creating an object the memory space required for respective attributes is allocated and the attributes are combined to form an object. The header discloses the size of respective attributes, thereby enabling the information in the object to be interpreted correctly. The header may also include an index which includes a pointer that points to respective attributes.

When storing a table in a memory in practice, it is seldom that the memory has continuous memory space for storing the entire table, since a memory is often fragmented to a greater or lesser extent. In the majority of cases, a table is too large to be accommodated on one page. The various objects in a table are thus spread on one page, and a table is divided up over several such pages.

A fragment is a part of a table and also includes several different pages. In distributed databases, a table can be distributed over several processor nodes in the distributed database. A fragment is then a part of a table found in a node. A fragment also includes all replicas of the same part of the table. Thus, a fragment can include a primary replica of a part of a table stored in a node and a secondary replica of the same part of the same table stored in another node. Several different replicas of different fragments of the same or different tables may be stored in one node.

In the case of large objects, it is not unusual to find it necessary to divide-up the various objects and store these object-divisions at different locations in a page, or to divide the object up between different pages. For instance, a large object may be one where one or more attributes is/are comprised of a text file that can include several thousand characters.

In the case of large objects, it is known in connection with disk memory databases to use for a table and for the objects in a table, advanced data-structures that build a tree-structure, such as a B-tree.

An object is then divided-up into different parts and these parts stored in available memory spaces in accordance with the tree-structure. The header for respective objects will then include a pointer which points down in a B-tree, thereby enabling the different parts of the object to be found. The parts need not necessarily constitute a whole attribute and the object can be handled as one single, continuous character string and divided-up in any desired way according to the memory spaces that are available.

This procedure is normally applied when an object is so large as to cover a full page and where a change is written directly into the disk memory. If the information is not written directly into the disk memory, some type of log is required.

In such cases where the object is very large, very comprehensive log files are required.

When changes are made to a fragment, such as when adding or removing an object or when changing, updating, an attribute in an object, it will sooner or later be necessary to store the change in a lasting manner, regardless of whether the change concerns a disk memory database or a primary memory database.

By long-lasting it is meant that the information will remain stored even though parts of the system or the whole of the system crashes, for instance. However, long-lasting storage is not obtained in the primary memories when storing in the disk memories. It takes time to write into and read from a disk memory, and this is done only at certain time points. The disk memory is updated in accordance with the primary memory by one full page at a time.

If a processor crashes, it is necessary to carry out all committed transactions while aborting all non-committed transactions. Two types of information are stored to handle this event.

REDO-information is used to enable committed changes that have been carried out in the primary memory but still not stored in the disk memory to be redone in conjunction with restoring the information that has been lost when a processor crashes.

UNDO-information is used to undo changes that are still not committed but have been written in the disk memory, in conjunction with restoring information that is lost when a processor crashes.

This information is stored as log-information and is usually stored in a so-called fragment log where all changes that affect a fragment are stored in a log. Log-information can be collected and stored in many different ways.

A physical log stores all changes that take place. The log works on a bit level and stores the information as it was prior to the change and as it is after the change. The physical log logs all changes, even a defragmentation of a fragmented file or a fragmented memory space, which is not a true information change but merely a redistribution of memory space. It will be understood that such a log is very capacity-demanding, both with respect to memory space and processor time.

A physiological log stores only changes of data within a part of a memory space, and not memory space redistributions. An internal address of a relevant part, such as an index to a page index of said relevant part is saved in the log, and also the change that took place in said part.

A logical log stores only a change of an attribute within an object.

For instance, if an object having the key "Kalle" and an attribute having the value "12" are changed, so that the attribute becomes "14", "Kalle" and the attribute "12" are stored in the UNDO-log and "Kalle" and the attribute "14" are stored in the REDO-log, simply put.

This enables the value of the attribute to be reset to "12" through the UNDO-log and set to "14" through the REDO-log. This information is not coupled to the object with the key "Kalle" being stored in a specific position in a memory, but that the object having the key "Kalle" is sought when using the log and the necessary correction carried out.

When an object has been divided into several different pages, it is necessary to download all pages into the disk memory simultaneously, in order for consistency to prevail between the pages. Thus, a check-point, a frozen time point, is created at the start of downloading to the disk memory, and all pages within a fragment are then written down into the disk memory.

There are two types of consistent check-points, to-wit action consistent check-points and transaction consistent check-points.

In a transaction consistent check-point, all transactions that affect an object within a fragment that is being downloaded into the disk memory shall be stopped and all ongoing transactions completed. The actual process of writing into the disk memory is then carried out, which may take several minutes in the case of large fragments. This means corresponding waiting times for stopped transactions.

Corresponding action consistent check-points are carried out in the same way, although with the difference that a stop is permitted midway in a transaction while waiting for the finalisation of all ongoing actions, parts of a transaction. Thus, waiting times in conjunction with action consistent check-points are shorter than the waiting times involved in transaction consistent check-points.

It is known to use a so-called fuzzy check-point in combination with a local physiological log.

The local physiological log enables in co-operation with writing into a disk memory all pages belonging to a fragment the use of a fuzzy check-point that eliminates waiting times in respect of actions that affect objects to be written into a disk memory.

It is also known to create in conjunction with primary memory databases a new replica of an object in the event of an object change, where the new replica includes the object after the change and the old replica includes the object before the change, or vice versa, with a link between the two replicas.

Since the two replicas include both the old and the new information, no logic UNDO-information is needed in this case, but solely a logic REDO-log. This is difficult to use in disk memory databases, since it is probable that the new replica will land on a page different to the old replica, although it is possible in primary memory databases, since these databases often use transaction consistent check-points, which are seldom found in disk memory databases.

The term location and replication independent log will also be described. By this is meant a log that can be used in the recreation of information that was lost in conjunction with the crash of a fragment or in the total crash of an entire system, where this recreation of said information can be effected in any processor and associated memories (location independent) and with a starting point from any replica, such as a primary or secondary replica, of the log (replica independent).

The following publications describe the handling of log-information and different data-structures. These publications can be considered to teach part of the known technology.

"ARIES: A Transaction Recovery Method Supporting Fine Granularity Locking and Partial Rollbacks Using Write-Ahead Logging", C. Mohan, Don Haderle, Bruce Lindsay, Hamid Pirahesh, Peter Schwarz, ACM Transactions on Database Systems, March, 1992, Vol. 7, No. 1, p. 94.

"The Architecture of the Dali Main-Memory Storage Manager", P. Bohannon, D. Liuwen, R. Rastogi, S. Shesadri, A. Silberschatz, S. Sudarshan, Memoranda from Lucent Technologies, http://www.bell-labs.com/project/dali/papers.html "Transaction Processing: Concepts and Techniques", J. Gray, A. Reuter, Morgan Kaufman, 1993.

"The Lorel Query Language for Semistructured Data", S. Abiteboul, D. Quass, J. McHugh, J. Widom, J. Wiener, Technical Report from Department of Computer Science, Stanford University.

"Main Memory Database Systems: An Overview", H. Garcia-Molina, K. Salem, IEEE Transactions on Knowledge and Data Engineering, Vol. 4, No. 6, December, 1994.

"INFORMIX-Online Dynamic Server, Database Server", Informix Software, Inc., December, 1994.

"Recovery in Parallel Database Systems", S-O. Hvasshovd, Vieweg, ISBN 3-528-05411-5.

"An Evaluation of Starburst's Memory Resident Storage Component", T. J. Lehman, E. J. Shekita, L-F. Cabrera, IEEE Transactions on Knowledge and Data Engineering, Vol. 4, No. 6, December, 1992.

"System Support for Software Fault Tolerance in Highly Available Database Management Systems", M. P. Sullivan, Ph.D. Report.

SUMMARY OF THE INVENTION

Technical Problems

When considering the present standpoint of techniques as described above, it will be seen that a technical problem resides in the provision of a method for handling log-information that will provide a reliable database, where simple handling of variable and dynamic attributes is possible, and where much less log-information is required than in earlier known cases.

Another technical problem resides in providing a log that is location- and replica-independent, and then particularly a method suitable for distributed databases where the log can be used to recreate parts of a table or an entire table that has been lost due to the crash of one or more processor nodes, or when the entire system has crashed totally, and where the table parts or the entire table can be recreated in a processor node that is totally different to the original node.

Another technical problem is one of providing a method whereby necessary log-information can be collected, and whereby database changes in a primary memory can be saved in a disk memory in real time.

Another technical problem is one of providing a method that will work with both disk memory databases and primary memory databases.

Still another technical problem is one of providing a method which handles fuzzy check-points in combination with a physiological log, and which enables the amount of log-information required to be greatly reduced in relation to known technology.

Another technical problem is one of providing a method where the number of cache-misses when searching for certain log-information can be greatly reduced in relation to known technology.

Yet another technical problem is one of being able to use local log-information that may be different for different parts of the database, so as to provide a local-independent and application-independent log.

Solution

With the intention of enabling one or more of the aforesaid technical problems to be resolved, and with a starting point from the method defined in the introduction, it is proposed in accordance with the present invention that in order to manage solely with one physiological UNDO-log and one logic REDO-log, the logical UNDO-information which is required for the fuzzy check-point and for which no traditional log has been created is obtained by creating a further part on one of the pages in the event of a change of a part in which old data-information shall be replaced with new data-information, said further part being structurally a replica of the changed part and the changed part and the further part being linked together.

The logical UNDO-information is implemented by virtue of the changed part including the new data-information and the further part including the old data-information.

The possibility of maintaining a necessary log in real time is provided through co-action between the fuzzy check-point and the physiological log. When the physiological log is an UNDO-log, this co-action or co-operation resides in saving in the UNDO-log all events that occur locally on one page subsequent to having set a local check-point and up to the time at which the page is written into a corresponding disk memory. Alternatively, when the physiological log is a physiological REDO-log, this co-operation resides in saving in the REDO-log all events that occur locally on one page subsequent to writing said page into a corresponding disk memory and up to the time at which a local check-point is set.

It will be noted that in the case of a physiological REDO-log, the log solely functions in conjunction with pure primary memory databases, whereas a physiological UNDO-log will function both in respect of primary databases and disk memory databases and thus also in respect of databases that are combined primary memory and disk memory databases.

With the intention of providing a method that can be used effectively with both primary memory databases and disk memory databases and also in databases that are combined primary memory and disk memory databases, it is proposed in accordance with the present invention that the physiological log is a physiological UNDO-log. The following description is thus concerned with a physiological UNDO-log.

In order to save memory space and not to store unnecessary information unnecessarily, the further replica, or copy, is removed after the transaction that caused the change has been completed or committed, or in conjunction with such completion.

In conjunction with the creation of this further replica, information to this effect is stored in the physiological log. When the further replica has been removed and when the change is written into the disk memory, information to the effect that the further replica has been removed is stored in the physiological log.

If logging of the change has still not been written into the disk memory, it is proposed that information relating to the creation of said further replica is removed from the physiological log instead of inserting information to the effect that the further replica has been removed. This reduces the size of the log instead of increasing the same, therewith further reducing the amount of log-information required.

With the intention of simplifying collection of the information that replaces one of the logical logs, and also with the intention of enhancing the ability to find desired information with as few memory accesses as possible, i.e. as few collections of information to the cache memory as possible, it is proposed in accordance with the invention that a special page is used to store any further replicas.

In a database, and particularly in a distributed database, a plurality of different local check-points are created for different areas of the database, for instance for different tables or different fragments. These different check-points are controlled locally within respective areas of the database.

A location and replica independent log is obtained in the following way. A global check-point is generated continuously and periodically. In simple terms, this is achieved with the aid of a counter that counts-up regularly. Each transaction is given the value of the global check-point at the time when the transaction concerned is committed.

A global system check-point is the time point at which the log-information is stored in a disk memory, this log-information concerning the commitment of all transactions that have a common global check-point and all transactions that belong to preceding global check-points.

A lost area, such as a fragment that has been lost due to a crash of one or more processor nodes belonging to the database or because of a total crash of the entire database, is recreated in accordance with the local log-information that is found for the area concerned, subsequent to the latest created global system check-point and prior to the latest created local check-point.

This procedure provides action consistent check-points in real time, which, in turn, enables the creation of links to other pages, these links being reliable even in the event of changes in the database.

This enables the use of complicated data-structures where objects having variable and/or dynamic attributes can be implemented and handled in a simple, time- and memoryspace-wise effective manner.

The present invention also enables the use of a data-structure in the form of a B-tree, where said parts are comprised of leaf-nodes belonging to the B-tree.

Another possible data-structure is one in which elements are placed in accordance with a structure that builds on a mathematical function, such as a hash function, where said parts are comprised of said elements.

Advantages

Those advantages primarily afforded by an inventive method are that necessary log-information is made readily available in an effective manner, despite the use of an advanced data-structure in storing objects. Furthermore, the log includes one physiological UNDO-log and only one logical REDO-log, since UNDO-information is obtained through the creation of replicas of changed parts, where the replica in combination with the original contains necessary UNDO-information. The amount of information required when using the further replica is less than the amount of information required in a logic UNDO-log.

The present invention also provides an action consistent check-point for both primary memory databases and disk memory databases, meaning that references between the pages is reliable, which, in turn, enables flexible handling of the data-structure of an object even in a disk memory database.

The primary characteristic features of an inventive method are set forth in the characterizing clause of the following claim 1.

BRIEF DESCRIPTION OF THE DRAWINGS

So that the invention will be more readily understood and further features thereof made apparent, the invention will now be described in more detail by way of example only with reference to the accompanying drawings, in which.

DETAILED DESCRIPTION OF PREFERRED EMBODIMENTS

Many different sorts of log-information are known in the art.

Because there is a great need for a location and replica independent log in respect of distributed databases, the present invention is based on the use of a logical log.

A logical log requires a consistent check-point, which is difficult to achieve in conjunction with, e.g., disk memory-based databases. The check-point chosen is an action consistent check-point, since this requires a shorter waiting time than that required by a transaction consistent check-point.

It is desirable to maintain a reliable log in real time, meaning that no waiting times can be accepted. Fuzzy check-points are thus used.

In combination with a physiological log, a fuzzy check-point will provide an action consistent check-point which, in turn, enables references to be used between different pages. This enables the use of replicas of changed attributes in an object, where the replicas can be placed in any page whatsoever, and where these replicas can replace, e.g., the logical UNDO-information.

This also enables the log to be used in a re-creation process subsequent to the crash of both different object structures and index structures.

The invention is based mainly on a combination of three known procedures, in which:

objects, irrespective of size, are stored in a structure that enables the object to be divided into smaller parts;

fuzzy check-points and a physiological log are used in updating the disk memory relative to the primary memory; and a further part, a new replica of a part, is created in the event of a change of the part concerned, where said further part includes, for instance, the information prior to said change, and the original part includes information subsequent to said change;

where the original part is comprised, for instance, of a leaf-node in a tree-structure or an element positioned through a mathematical function, such as a hash function.

The logical UNDO-log can thus be omitted, since it is replaced by said further part.

When a fuzzy check-point is used, a physical or physiological log is required as well as logic UNDO-information and REDO-information to create a consistent check-point.

Figure 1:
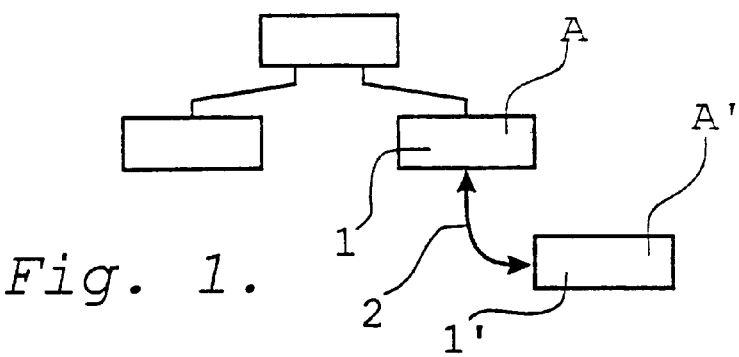
FIG. 1 illustrates schematically part of a B-tree and the replication of a part of this tree.

FIG. 1 illustrates part of a B-tree in which a leaf-node 1 includes data-information that shall be changed. In this case, the necessary logical UNDO-information can be implemented by creating a further part 1' on one of the database pages when changing the part 1, where the old data-information A shall be replaced with new data-information A'. This further part 1' is structurally a replica of the changed part 1. The changed part 1 and the further part 1' are mutually linked 2 in some way or another.

In the illustrated case, the changed part 1 includes the new data-information A', and the further part 1' includes the old data-information A.

The necessary logical REDO-information is stored in a traditional logic REDO-log.

Figure 2:
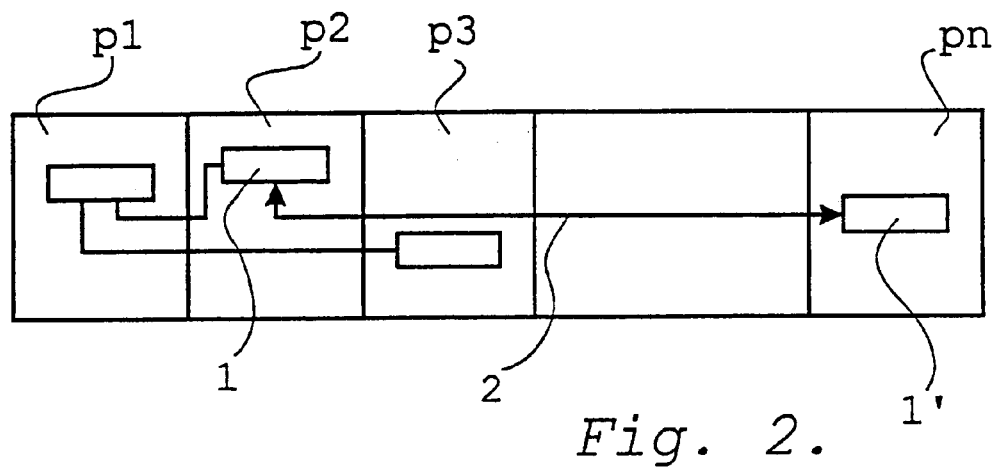
FIG. 2 illustrates schematically the division of a tree according to FIG. 1 into a number of different pages.

FIG. 2 shows a part of a tree-structure according to FIG. 1, where respective parts are distributed on different pages p1, p2, . . . , pn in the database. The present invention also proposes the use of a special page pn for storing any further replicas 1'.

The advantage with this is that:
  access to this page is achieved more rapidly, since page pn is used again and again; and that
  a primary memory-based page is used, even though the relevant part of the database is disk memory-based, which requires less physiological UNDO-information than that required in the case of a disk memory-based page.

The fuzzy check-point co-operates with a physiological log, which is comprised of an UNDO-log.

Figure 3:
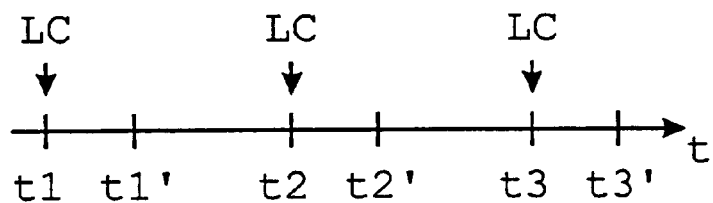
FIG. 3 illustrates two different ways of working with a physiological log.

FIG. 3 illustrates how this physiological log co-operates with the updating of the disk memory in relation to those changes of data-information that constantly take place in the primary memory. These updatings take place at particular time points t1, t2, t3, . . . wherein an updating is commenced at respective time points.

This updating can affect a plurality of different pages, for instance all pages belonging to a table or all pages belonging to a fragment. These pages are written sequentially into the disk memory, one at a time. It takes a certain amount of time, t1–t1', to write all affected pages into the disk memory. A local check-point LC is set in conjunction with each updating.

As shown in FIG. 3, the local check-point LC shall be set when updating begins t. In a primary memory database, everything that takes place locally on a page after having set a local check-point LC and up to the time at which the page is written into a corresponding disk memory is saved in the physiological UNDO-log. This takes place somewhere between the time points t and t'.

In a disk memory database, all changes are written continuously into the physiological log. Thus, a disk memory database requires considerably much more log-information than does a primary memory database.

Irrespective of whether the database is a primary memory database or a disk memory database, the total log-information stored is comprised of a logical REDO-log, a physiological UNDO-log, and the requisite logical UNDO-information obtained through the further part 1'.

This log-information is considerably less than that which is required traditionally to maintain necessary log-information.

The logical UNDO-information is no longer required after commit. This enables the further part 1' to be removed after, or in conjunction with, completing or committing the transaction that has caused the change. This thus affords a further reduction in the memory space utilised.

Figure 4:
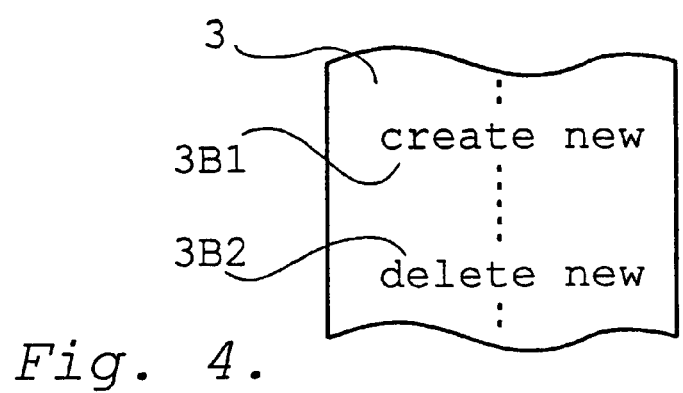
FIG. 4 is a simplified illustration of part of a physiological log.

FIG. 4 shows that in conjunction with creating the further part 1', information 3B1 to this effect is stored in the physiological log 3. When logging of the change is written into the disk memory before the transaction is committed, information 3B2 revealing that the further part 1' has been removed is also stored in the physiological log 3.

On the other hand, if logging of the change has still not been written into the disk memory, it is proposed that the information 3B1 revealing that creation of the further part 1' is removed from the physiological log 3, instead of adding further information 3B2 to the effect that said further part 1' has been removed.

This saves further memory space for the physiological log 3.

Figure 5:
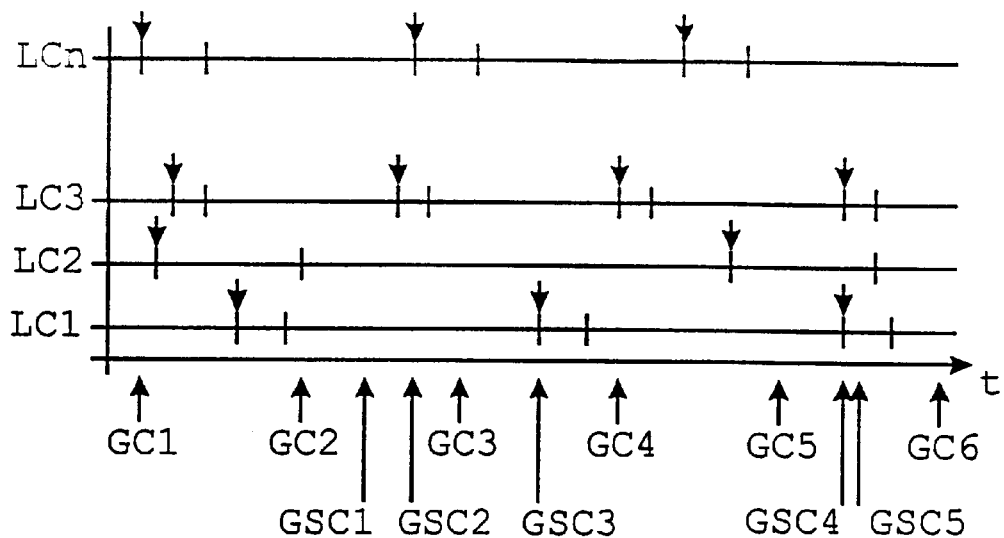
FIG. 5 is intended to illustrate the co-action between different local check-points and a global check-point.

The use of a method according to the aforegoing provides a number of different local check-points for different database areas, for instance for a table or for a fragment. FIG. 5 illustrates how respective areas have different local check-points LC1, LC2, LC3, . . . , LCn, where the different check-points are controlled locally in respective areas.

A location and replica independent log is obtained in the following way. A global check-point GC is generated continuously and periodically GC1, GC2, GC3, . . . In simple terms, this is implemented by a counter which counts-up regularly. Each transaction is allotted the value for the global check-point GC at the time at which the transaction concerned is committed.

A global system check-point GSC1, GSC2, GSC3, . . . is the time point at which specific log-information is stored in a disk memory, this log-information relating to all transactions that have a common global check-point GC, and all transactions that belong to preceding global check-points are committed.

Re-creation of a lost area, such as a lost fragment in conjunction with a crash of one or more process-nodes belonging to the database or in the event of a total crash of the entire database, is effected by re-creating the area according to the local log-information LC that is found for the area after the latest created global system check-point GSC and before the latest created local check-point LC.

The log-information can then be used globally, for instance when re-creating a locally lost area, such as a fragment that is lost when one or more processor-nodes belonging to the database crash, by re-creating the local area according to the local log-information that is found for this area after the latest created global system check-point GSC and before the latest created local check-point LC.

The data-structure used may suitably be a B-tree, where said parts are comprised of leaf-nodes belonging to the B-tree, or may be comprised of a structure that builds on placing elements in accordance with a mathematical function, such as a hash function, where said parts also comprise elements or parts of said elements.

The present invention also enables the use of those inventions described in the Swedish Patent Applications 97 02760-1 "A Method for Storing Elements in a Database", and 97 02761-9 "Structure for a Database" filed on the same day as the present Application, in both primary memory databases and disk memory databases. These Applications are also considered to form a part of the present Application.

The combination of reliable links between different pages and an advanced data structure, such as the B-tree-structure, for instance, enables variable and dynamic attributes to be handled readily and in a flexible manner. The aforesaid combination also enables fixed attributes to be divided-up, regardless of their size.

Division of attributes in a tree-structure also results in leaf-nodes of adapted smallness, whereby the part that needs to be replicated in conjunction with changes is equally as small as its corresponding leaf-node.

Figure 6:
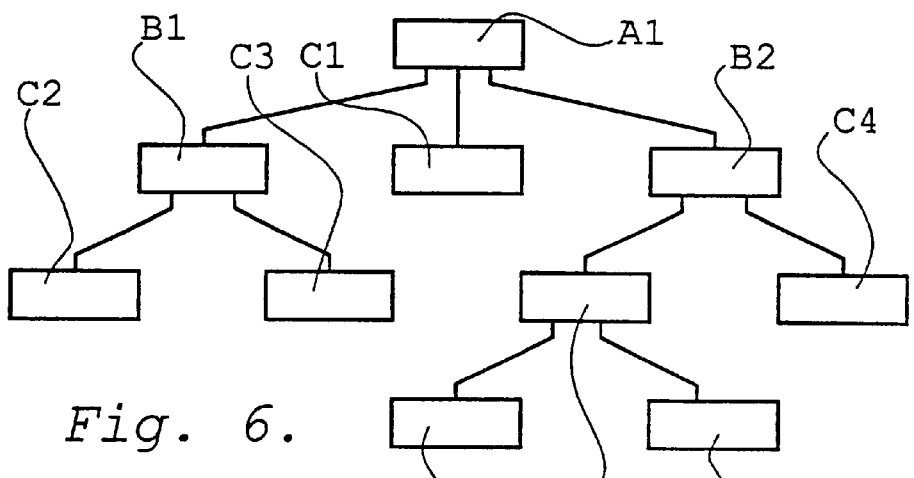
FIG. 6 is a schematic illustration of an alternative structure for an object or for part of an object, in conjunction with handling different attributes.

An attribute can be assigned a structure according to FIG. 6. An object header then includes the information that constitutes a root-node A1 in the B-tree. The root-node A1 points to intermediate nodes B1, B2, or directly to a leaf-node C1. The intermediate nodes B1, B2 point, in turn, to further intermediate nodes B3 or to a leaf node C2, C3, C4, C5, C6.

The leaf-nodes C1, C2, C3, C4, C5, C6 may also be made sufficiently large to accommodate an attribute. This enables variable attributes to be readily handled, i.e. attributes that can vary in size from object to object within a table. The leaf-nodes C1, C2, C3, C4, C5, C6 may also be made sufficiently large to be accommodated within an available memory space. This provides for flexible and effective memory handling.

Figure 7:
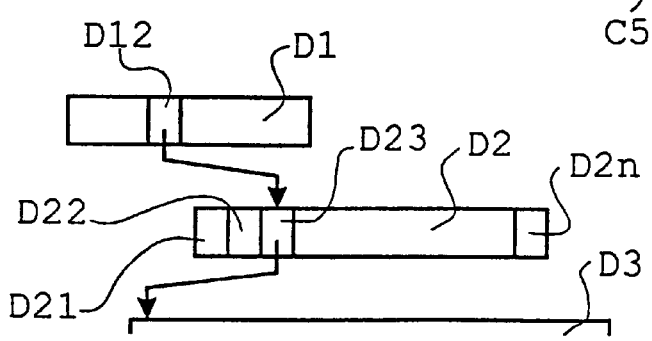
FIG. 7 is a schematic illustration of another alternative structure for an object or for part of an object, in conjunction with handling dynamic attributes.

FIG. 7 illustrates handling of a dynamic attribute. An object header D1 points, D12, to a register D2 covering different dynamic attributes. Different positions D21, D22, . . . , D2n in the register D2 point further to existing dynamic attributes D3. If an attribute is not found for a specific object, the header D1 does not contain a corresponding pointer D12.

The dynamic attribute D3 may, in turn, comprise a variable attribute that can be divided-up in a tree-structure according to FIG. 6.

This description shall not be burdened with a more detailed explanation of the structure for variable and dynamic attributes. The reader is referred to the dissertation "Design and Modelling of a Parallel Data Server for Telecom Applications", Ericsson Utvecklings AB, Mikael Ronström, 1997, with respect to this information.

It will be understood that the invention is not restricted to the aforedescribed and illustrated exemplifying embodiment thereof, and that modifications and variations can be made within the scope of the inventive concept as illustrated in the following claims.

What is claimed is:

1. A method relating to databases for providing reliable collection of log-information in conjunction with changes in the database, comprising, fuzzy check-points which are used with the purpose of enabling the waiting times normally occurring in the case of consistent check-points to be reduced, wherein said fuzzy check-points are combined with a physiological log with the intention of enabling log-information to be collected in real time, wherein data-information belonging to said database is divided into smaller parts in accordance with a predetermined data-structure, and wherein respective parts are distributed on mutually common or on different pages belonging to said database, wherein the logical UNDO-information required for said fuzzy check-point is implemented by creating a further part of one of said pages when one of said parts is changed, where old data-information shall be replaced with new data-information; in that said further part is structurally a replica of said changed part; in that said changed part and said further part are appropriately linked together; in that said changed part includes said new data-information; and in that said further part includes said old data-information, or vice versa.

2. A method according to claim 1, wherein said fuzzy check-point and said physiological log co-act by virtue of said physiological log comprising an UNDO-log; in that all that takes place locally on one page after a local check-point has been set and up to the point at which said page is written into a corresponding disk memory is saved in said UNDO-log, or in that said physiological log is comprised of a physiological REDO-log and that everything that takes place locally on a page after writing said page into a corresponding disk memory and up to the time at which a local check-point has been set is saved in said REDO-log.

3. A method according to claim 2, wherein said further replica is removed after, or in conjunction with, completing or committing the transaction that has caused said change.

4. A method according to claim 3, wherein information disclosing that said further replica has been created is stored in said physiological log, and wherein said further replica has been removed, wherein when the physiological log for said change is written into said disk memory, information disclosing that said further replica has been removed is stored in said physiological log; and in that when the physiological log for said change is still not written into said disk memory, said information disclosing the creation of said further replica is removed from said physiological log.

5. A method according to claim 4, wherein said physiological log is a physiological UNDO-log.

6. A method according to claim 1, wherein a special page is used for storing any further replicas.

7. A method according to claim 6, wherein said special page is comprised of a primary memory-based page.

8. A method according to claim 1, wherein different local check-points are created for different areas of the database, for instance for a table or a fragment, and wherein the different check-points are controlled locally in said area of the database, wherein a location and replica independent log is obtained by generating a global check-point at specific time points; in that global system check-points are created on the basis of said global check-points; in that an area, such as a fragment, that has been lost in conjunction with a crash of one or more process-nodes belonging to said database is re-created by re-creating said area in accordance with the local log-information present in respect of said area after the latest created global system check-point and before the latest created local check-point.

9. A method according to claim 1, wherein said data-structure is comprised of a B-tree; and in that said parts are comprised of leaf-nodes belonging to said B-tree.

10. A method according to claim 1, wherein said data-structure is comprised of elements positioned in accordance with a structure that is based on a mathematical function, such as a hash function; and in that said parts are comprised of said elements or parts of said elements.

* * * * *